Nov. 28, 1961 R. N. HAYNIE 3,010,748
RADIAL SHAFT SEAL WITH RESILIENT SEALING ELEMENT BONDED
TO AN ANGULARLY EXTENDING PERIPHERAL CASE PORTION
Filed Feb. 11, 1957

United States Patent Office 3,010,748
Patented Nov. 28, 1961

3,010,748
RADIAL SHAFT SEAL WITH RESILIENT SEALING ELEMENT BONDED TO AN ANGULARLY EXTENDING PERIPHERAL CASE PORTION
Robert N. Haynie, Mountain View, Calif., assignor to Federal-Mogul-Bower Bearings, Inc., Detroit, Mich., a corporation of Michigan
Filed Feb. 11, 1957, Ser. No. 639,276
3 Claims. (Cl. 288—3)

This invention relates to an improved fluid-sealing device of the type used to seal between two relatively rotating members. In particular, it relates to an improved dual-lip lubricant-retaining shaft seal. A pending divisional application covers the lip anchorage as applied generally to both single and dual lip structures.

One object of this invention is to provide an improved anchorage for securing a molded elastomeric sealing lip to a rigid member.

Another object of the invention is to provide an improved shaft seal wherein a radially extending annular flange of a case member is provided with an angularly extending or frusto-conical peripheral portion, and wherein a synthetic rubber member providing the sealing lip is anchored substantially exclusively to that peripheral portion.

Another object of the invention is to achieve sealing lip anchorage with a minimum amount of the synthetic rubber composing the lip, thereby providing significant savings in materials and material costs.

Another object of the invention is to provide an improved double-lip seal construction wherein independent action of each lip is achieved.

Another object of the invention is to limit the area where the rubber lip portion is bonded, so that it is only a restricted part of the surface of the case, and to prevent adhesion of rubber, including flash, to other parts of the case.

As implied by the foregoing objects, the product of this invention comprises a fluid seal of the type having an annular rigid case member and an annular synthetic rubber sealing member anchored to the case member by being bonded to it. The case member has an annular radial flange, a peripheral portion of which, in this invention, is turned or bent or formed to provide a frusto-conical annular tip to which the sealing lip is bonded. Moreover, the sealing lip portion is preferably not bonded to any other portion of the case. More specifically, the lip portion is bonded to substantially the entire inner face, the entire end edge and a portion of the outside face of the frusto-conical tip.

Other objects and advantages of the invention will appear from the following description of several preferred embodiments thereof.

Figure 2:
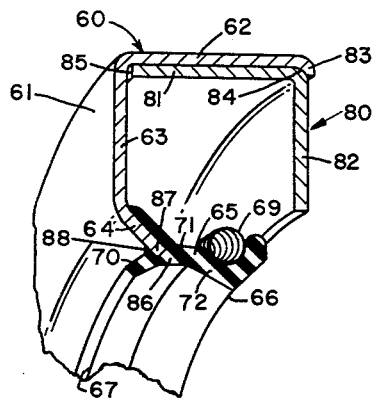
Figure 3:
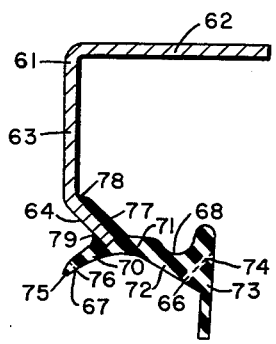
Figure 1:
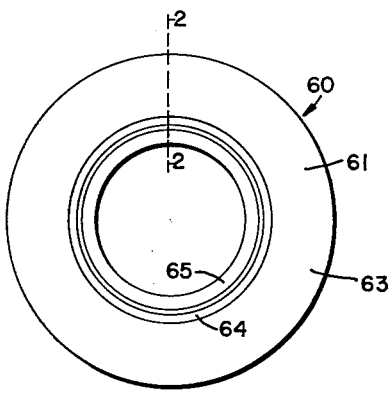

In the drawings:
FIG. 1 is a front view in elevation of a shaft seal embodying the principles of the present invention, looking from the left hand side of the seal as shown in FIG. 2.
FIG. 2 is an enlarged fragmentary view in perspective and in section taken along the line 2—2 of FIG. 1.
FIG. 3 is a further enlarged sectional view of the outer case member and sealing lip of FIG. 2, the sealing lip being shown in this view before trimming, with the trim lines indicated by broken lines.

The shaft seal 60 shown in FIGS. 1 and 2 is composed of four principal elements; a rigid metal outer case member 61, a rigid metal inner case member 80, a resilient sealing member 65, and a garter spring 69. The garter spring 69 is not employed with every type of shaft seal and is sometimes omitted.

The outer case member 61 may be an integral annular member formed to provide a radially extending annular portion or radial flange 63 and an outer cylindrical portion or axial flange 62, which may fit into a housing bore.

The inner case member 80, used in many types of seals but not always necessary, may have an axially extending portion 81 nested into the axial flange 62 of the outer case 61, and a radially extending portion 82, and may be clamped into the outer case 61 by the turned-over edge portion 83 at the inner case corner 84, with the end 85 of the axial portion 81 bearing against the radial flange 63.

A very important structural feature of the product of the present invention is the generally frusto-conical end portion or tip 64 of the radial flange 63 to which the sealing member 65 is bonded. This tip 64 may be either at the inner periphery or pierce in an internal-type seal, or at the outer periphery of an external-type seal, and the tip 64 may either be turned axially inwardly, or axially outwardly. The important thing is that to that tip portion 64, and substantially to that portion only, is bonded the rubber sealing member 65.

As shown in FIG. 2 and FIG. 3, the anchorage of the sealing lip 65 is accomplished by a generally radial or frusto-conical portion 77 bonded to the inner face of the tip 64, a portion 86 bonded to the end edge 87 (which may be very small, depending on the thickness of the metal used for the case member 61), and an outer portion 88 bonded to a portion comprising part but not all of the outer face of the tip 64. The synthetic rubber which may be of any desired oil-resistant type, as known well in the art, stops sharply at points 78 and 79, respectively, of the inner and outer faces. Note that the cutoff 78 lies right at the corner where the tip 64 joins the radial portion of the flange 63. Also note that the cutoff 79 lies between (approximately half way between) the edge 87 and the corner on the outer face. The sharp cutoff and the confining of the rubber anchorage to the tip 64 gives adequate and accurate anchoring of the seal member 65 without excess volume of material and without flash, which would be objectionable. Substantial amounts of rubber are saved by this method, while the very tight bond provides quite accurate holding.

The sealing lips 66 and 67 are easily obtained by one simple knife cut each along the lines 74 and 76 in FIG. 3, cutting off the excess portions 73 and 75. This trimming is the only operation after molding, due to the absence of flash from the seal 60.

The resilient sealing lip member 65 is provided with two lips 66 and 67. The lip 67 may be used for sealing out dust rather than for fluid sealing, while the fluid is sealed by the lip 66. The lubricant-sealing lip 66 may be provided with a spring-receiving cavity 68 to receive a garter spring 69, while the dust-sealing lip 67 requires no spring.

Independence of these two lips 66 and 67 from each other is a greatly desired quality but one that is not easily obtained. However, the present invention does give this desired independence, because the dust-sealing lip 67 is on the opposite side of the in-turned, frusto-conical portion 64 from the fluid-sealing lip 66, and the dust lip 67 is backed up by and supported substantially directly by the tip 64 and its lip base 70. A diaphragm-like web portion 71 connects the dust lip base 70 to the base 72 of the lubricant-sealing lip 66, which is supported by a different part of the tip 64. As a result, any movement of the spring-urged sealing lip 66 is not transmitted to the dust sealing lip 67, which is kept independent, and vice versa. This independence is an important advantage of the present invention, where it is easily obtained;

whereas it was very difficult and, in some cases, impossible to provide with prior art lip anchorages.

FIG. 6 shows the seal 60 as it comes from the mold. In this instance, the sealing lip 66 is formed by trimming off the excess portion 73 along the line 74, while the sealing lip 67 is formed by trimming off the excess portion 75 along the line 76. Note that the larger portion 77 of the rubber anchor stops short at the corner 78. The other cutoff 79 lies on the outer face of the tip 64 intermediate its edge and the corner 78.

The foregoing example illustrates the basic principles of the product aspects of the invention, but by no means exhaust its possibilities. Men skilled in the art will be quick to see how the invention applies in many fields and to many types of seals, and will readily be able to design further modifications, all coming within the scope of this invention.

While a relatively small angle will obtain some of the advantages of the invention, at least to a degree, the advantages are not generally fully obtained in a seal having a narrow tip, nor does the finished seal have a fully satisfactory appearance until the metal has been deformed at an angle of about 25° or greater, and in fact, an angle of 30° is preferably employed. Moreover, the width of the tip should not be too great if economy in the amount of rubber used for bonding is to be obtained. There is also a practical maximum limit of angle for most applications of the invention, due to the effect that the bending has, at angles greater than 45°, of pulling the inner pierce too far away from the shaft, and so a practical maximum of bending normally lies around 50°. This does not mean that seals cannot be made having extended molded portions to make up for the bending of the tip end portion, but it does mean that the best support for the sealing element is obtained in an angle less than 50°. In other words, dimensional stability, economy in the amount of rubber used in the bonding, and assurance of a closed stroke will usually combine to set a lower limit of 25°, although bending below that amount does not normally affect the sealing function of the device as such. On the other hand, above 50° the sealing function may be affected, as well as the economy of the material and greater angles import some compensation elsewhere if a satisfactory seal is to be applied. Thus, the range between approximately 25° and 50° is considered to encompass the preferable embodiment of the invention, with the range between 30° and 45° giving the best results of all.

The location feature which has been referred to is another very important advantage of this invention. Concentricity is assured so long as the inner pierce itself is properly made, since the pierce absolutely locates the case in the mold.

To those skilled in the art to which this invention relates, many additional changes in construction and widely differing embodiments of the invention will suggest themselves without departing from the spirit and scope of the invention as defined in the claims.

What is claimed is:

1. A device for sealing between two relatively rotating members, including in combination: an annular rigid member having a radial portion and first and second circular peripheries, the first periphery sealing against one said relatively rotating member, said second periphery being at the opposite end of said radial portion from said periphery and on an imperforate terminal portion bent through an acute angle meeting said radial portion along a circle spaced from said second periphery; and an annular elastomeric sealing member bonded to said rigid member only by a thin portion on the edge and by portions on the two faces of said terminal portion and having two sealing lips, one said lip being a frusto-conical dust-sealing lip extending directly from said terminal portion in a diagonal that extends radially between said terminal portion and the other relatively rotating member and axially toward the plane of said radial portion, substantially its full axial extent lying within the axial extent of said terminal portion, the other said lip being a lubricant sealing lip, said sealing member having a web thinner than said lubricant sealing lip extending out from said terminal portion in a generally axial direction away from the plane of said radial portion, said web joining said lubricant sealing lip to said terminal portion, whereby said dust-sealing lip is supported for independent action, substantially unaffected by the flexure of said web and said lubricant sealing lip, though molded integrally therewith, said terminal portion affording close direct support to said dust-sealing lip.

2. A device for sealing between a housing and a relatively rotating shaft, including in combination: an annular rigid member having an outer cylindrical peripheral flange for sealing against said housing and a radially-inwardly extending generally radial flange at one end thereof with a portion adjacent to and terminating at its inner periphery being formed as a frusto-conical imperforate terminal portion meeting a truly radial portion of said generally radial flange at an angle of between 25° and 50° and having two faces and a peripheral edge; an annular elastomeric member with two sealing lips for engagement with said shaft, said elastomeric member being bonded to said generally radial flange solely at an area confined to a portion of the surface of said terminal portion, said surface portion being only (a) the full width of the face toward which said terminal portion inclines, (b) said peripheral edge, and (c) part only of the other face, and bounded on each said face by a sharp circle of demarcation, said elastomeric member having a flexing web to which a first said lip is secured, said web extending axially out from said terminal portion in the axial direction away from said generally radial flange, the second said lip being generally frusto-conical and inclined oppositely to said terminal portion so that it extends toward the plane of said generally radial flange, being an integral part of said elastomeric member but on the opposite side of said terminal portion from said web, so that it is substantially independent of the fluxure of said web and of the movement of the lip secured to said web; and an annular spring mounted on said first lip for urging it into contact with said shaft, said second lip thereby being independent of said spring's pressure.

3. In a fluid seal of the shaft type, the combination of: an annular metal case member with a cylindrical rim and a generally radial flange, said flange having an annular portion, adjacent to and terminating in its pierce, formed into a frusto-conical imperforate end portion extending at an angle of 25° to 50° to the radial plane and in the same axial direction from said radial flange as said cylindrical rim and intersecting a truly radial portion of said flange; an integral annular oil-resistant elastomeric sealing member having a bonding portion bonded to said case only on the surface of said end portion (1) over the full extent of the radially outer face thereof, stopping sharply where the end portion intersects said flange, (2) by a thin portion around said pierce, and (3) to a portion only of the radially inner face thereof, stopping sharply at a circular line between said pierce and said intersection; said sealing member having a first lip secured directly to said bonding portion and lying entirely on one axial side of said end portion and extending therefrom toward the plane of said radial flange and stopping short of said plane so that said radial flange protects said first lip, a web secured directly to said bonding portion on the other axial side of said end portion and extending axially therefrom away from said radial flange, being connected to said first lip only by the thin portion passing around said pierce, and a second lip having a V-shaped inner periphery and a grooved outer periphery and secured to said web at the opposite axial extremity thereof from said end portion; and a garter spring in said grooved outer periphery of said second lip, said first lip being independent of the pressure of said spring on said second lip.

References Cited in the file of this patent

UNITED STATES PATENTS

| | | |
|---|---|---|
| 1,813,797 | Foley | July 7, 1931 |
| 1,892,505 | Evans | Dec. 27, 1932 |
| 1,949,823 | Broecker | Mar. 6, 1934 |
| 2,135,570 | Ellis | Nov. 8, 1938 |
| 2,145,928 | Heinze et al. | Feb. 7, 1939 |
| 2,203,163 | Leonard | June 4, 1940 |
| 2,235,735 | Bernstein | Mar. 18, 1941 |
| 2,240,332 | Heinze et al. | Apr. 29, 1941 |
| 2,280,857 | Saffold | Apr. 28, 1942 |
| 2,289,608 | Victor | July 14, 1942 |
| 2,542,141 | Horton | Feb. 20, 1951 |
| 2,743,951 | Ayres et al. | May 1, 1956 |
| 2,868,566 | Kosatka | Jan. 13, 1959 |